US006335529B1

(12) United States Patent
Sekii et al.

(10) Patent No.: US 6,335,529 B1
(45) Date of Patent: Jan. 1, 2002

(54) ULTRAVIOLET DETECTOR

(75) Inventors: Hiroshi Sekii; Akihisa Matsuyama, both of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/509,362

(22) PCT Filed: Aug. 18, 1999

(86) PCT No.: PCT/JP99/04445

§ 371 Date: Mar. 27, 2000

§ 102(e) Date: Mar. 27, 2000

(87) PCT Pub. No.: WO00/11440

PCT Pub. Date: Mar. 2, 2000

(30) Foreign Application Priority Data

Aug. 20, 1998 (JP) .......................................... 10-234370

(51) Int. Cl.[7] .................................................. G01J 1/42

(52) U.S. Cl. ...................................................... 250/372

(58) Field of Search ......................................... 250/372

(56) References Cited

U.S. PATENT DOCUMENTS 5,179,562 A * 1/1993 Marason et al. .............. 372/22

FOREIGN PATENT DOCUMENTS

| | | | | |
|---|---|---|---|---|
| EP | 1026485 A1 * | 8/2000 | | G01J/1/02 |
| JP | 50-30574 | 3/1975 | | |
| JP | 64-47921 | 2/1989 | | |
| JP | 5-231929 | 9/1993 | | |
| JP | 6-317463 | 11/1994 | | |
| JP | 10-167755 | 6/1998 | | |

* cited by examiner

*Primary Examiner*—Ricky Mack
(74) *Attorney, Agent, or Firm*—Morrison & Foerster LLP

(57) ABSTRACT

An ultraviolet detector has a wavelength conversion element 1 of a length in an incident direction of UV light 2 set longer than the direction orthogonal to the incident angle, and a light receiving element 3 arranged at a side plane 1*a* of wavelength conversion element 1. Unconverted ultraviolet does not exit wavelength conversion element 1, and is propagated downwards to be attenuated. Visible light having the wavelength converted in wavelength conversion element 1 is propagated in all directions and received at light receiving element 3. Light receiving element 3 detects the quantity of light according to the incident amount of ultraviolet. As a result, the detection sensitivity is ensured and degradation of the light receiving element caused by ultraviolet radiation does not occur.

9 Claims, 8 Drawing Sheets

2
UV LIGHT
3
1

13
11
MAIN CIRCUIT
12
ANALOG OUTPUT SIGNAL
14
15
16
NOT
17
AND
CONTROL CIRCUIT
18
19

ULTRAVIOLET DETECTOR

TECHNICAL FIELD

The present invention relates to an ultraviolet detector that converts the incident amount of ultraviolet radiation into a different wavelength by a wavelength conversion element for detection.

BACKGROUND ART

An ultraviolet detector employing a wavelength conversion element of interest to the present invention is disclosed in, for example, Japanese Patent Laying-Open No. 64-47921. FIG. 12A is a sectional view of the detection unit disclosed in this publication, and FIG. 12B is a diagram of the entire structure of the ultraviolet detector. Referring to FIGS. 12A and 12B, the detection unit of the ultraviolet detector includes a casing 107 having an upper opening 105 provided at the upper portion of the detection unit and a lower opening 106, in which a plate-like phosphor (wavelength conversion element) 108 is provided between openings 105 and 106. An optical fiber 109 is arranged at an end face of phosphor 108. An interference filter 110 is provided in the passage of optical fiber 109. A light receiving element 104 receives the fluorescence input via optical fiber 109 and interference filter 110. In this ultraviolet detector, the incident ultraviolet through opening 105 is converted into visible light by phosphor 108 to enter optical fiber 109 from the end face. However, most of the ultraviolet is output through opening 106 without being converted.

Another ultraviolet detector of interest to the present invention is disclosed in, for example, Japanese Patent Laying-Open No. 6-317463. This publication discloses an ultraviolet detector provided with a bandpass filter and a photodetector in a direction orthogonal to the traveling direction of the ultraviolet radiation to be measured.

As a conventional ultraviolet detector employing a wavelength conversion element, Japanese Patent Laying-Open No. 5-231929 discloses the structure in which a light receiving element is arranged at the rear of a wavelength conversion element.

In the aforementioned conventional ultraviolet detectors with the structure in which the light receiving element is located at the rear of a wavelength conversion element, there was a problem that the disturbance light cut filter must be formed of a separate member in order to prevent introduction of disturbance light of high transmittance into the wavelength conversion element. There was also the problem that the light receiving element is degraded when thin in thickness since the wavelength conversion element generally has a low conversion efficiency. In order to prevent the exit of unconverted UV (ultraviolet) light, it is desirable to set the thickness of the direction in which UV light is transmitted great to allow complete conversion internally. It is also to be noted that complete conversion cannot be implemented if the incident power is great. In the conventional optical system, the light receiving element will be degraded. If the wavelength conversion element is made thick, the absorption ratio of the wavelength-converted light increases to result in lower detection sensitivity of ultraviolet radiation.

Furthermore, in the case where visible light is provided to the optical fiber via the end face of a plate-like phosphor as in the ultraviolet detector shown in FIGS. 12A and 12B, sufficient quantity of light could not be obtained. As a result, sensitivity could not be achieved.

The present invention is directed to the above problems. An object of the present invention is to provide an ultraviolet detector with reliable ultraviolet detection sensitivity and with less degradation of the light receiving element.

DISCLOSURE OF THE INVENTION

An ultraviolet detector of the present invention is formed of a material that converts ultraviolet into light of a different wavelength, and includes a wavelength conversion element having a first plane on which ultraviolet is incident and a second plane from which converted light is output, and a light receiving element receiving the converted light output from the second plane. In the wavelength conversion element, the first plane and the second plane are non-parallel with each other, and the dimension in the direction perpendicular to the first plane is greater than the dimension in the direction perpendicular to the second plane.

According to the present invention, the wavelength conversion element has a relatively large dimension in the travelling direction of the ultraviolet, and a relatively small dimension in the direction towards the light receiving element. Therefore, the amount of ultraviolet arriving at the light receiving element after being output from the wavelength conversion element to become disturbance light is small, and the amount of ultraviolet arriving at the light receiving element after being incident on the first plane and output from the second plate is small. Thus, degradation of the light receiving element caused by the ultraviolet is small. Also, the ratio of the converted light absorbed by the wavelength conversion element is small since the travelling distance of the converted light through the wavelength conversion element before arriving at the light receiving element is short.

Preferably, the first plane is orthogonal to the second plane. Since the light receiving element is in the direction orthogonal to the incident direction, there is the advantage of being impervious to disturbance light.

Preferably, the wavelength conversion element is plate-like, and one of the end plane is the first plane, and either the front plane or back plane sandwiching the first plane and having a region of the largest area is the second plane. It is preferable to set one of opposite end planes having the region of the smallest area as the first plane.

Further preferably, at least the second plane of the wavelength conversion element is planar with respect to the ultraviolet wavelength. By setting the side plane of the wavelength conversion element located at the light receiving element side as a mirror plane, the diffusion component at the surface can be eliminated to suppress the output of the ultraviolet or disturbance light. The second plane and the plane opposite to the second plane can be set planar with respect to the ultraviolet wavelength. All the planes adjacent to the first plane can be set planar with respect to the ultraviolet wavelength.

Further preferably, the light receiving element is arranged so that its center is located opposite to the position closer to the first plane than the center position of the second plane.

Further preferably, incident angle restriction means is further provided for restricting the incident angle of the ultraviolet entering the first plane. The incident angle restriction means restricts the incident angle of ultraviolet entering the first incident plane including the normal of the second plane to be within a predetermined angle, and allows the ultraviolet in the second incident plane perpendicular to the first incident plane to be incident at an incident angle greater than the predetermined angle.

Here, the incident angle refers to the angle between the normal of the plane of the point where the ray is incident and the ray.

The incident plane refers to the plane that includes the travelling direction of the wave incident on the surface and the perpendicular line of the surface.

Preferably, "predetermined angle" corresponds to an angle at which the ultraviolet incident at an incident angle within that angle is totally reflected at the second plane and does not reach the light receiving element. As to the ultraviolet in the second incident plane, it is not necessary to intentionally restrict the incident angle since the ultraviolet radiation, even if entering at a large angle, will not reach the light receiving element assuming that the influence of irregular reflection within the casing of the ultraviolet detector is neglected. Rather, allowing incidence at a large incident angle will cause a larger amount of ultraviolet to be directed towards the wavelength conversion element to provide the advantage of increasing the quantity of converted light.

Further preferably, an incident window is provided formed of a material converting ultraviolet radiation into converted light of a different wavelength in order to attenuate the ultraviolet incident on the wavelength conversion element.

Since a wavelength conversion material is provided above the wavelength conversion element, no dent will be generated at the incident portion of the ultraviolet. Accordingly, there is less possibility of dust being gathered. The influence by the disturbance light can be reduced.

Further preferably, the ultraviolet detector further includes a detection circuit providing a detection signal of a level corresponding to the level of output of the light receiving element, display means turned on when the level of the detection signal is within a set range, and sensitivity adjustment means for adjusting the sensitivity of the detection signal with respect to the amount of ultraviolet received by the ultraviolet detector.

The sensitivity can be adjusted by altering the amplification factor of the detection circuit. Also, an aperture can be used to adjust the sensitivity capable of changing the transmitting amount of ultraviolet and restricting the amount of ultraviolet incident on the wavelength conversion element. It is preferable that the range of the display means has an upper limit value and a lower limit value.

According to another aspect of the present invention, an ultraviolet detector is formed of a material that converts ultraviolet into light of a different wavelength, and includes a wavelength conversion element having a first plane on which ultraviolet is incident and a second plane from which converted light is output, and a light receiving element receiving converted light output from the second plane. In the wavelength conversion element, the first and second planes are non-parallel with each other, and the dimension in the direction perpendicular to the first plane corresponds to the dimension that can convert at least 80% the ultraviolet incident from the first plane into converted light of a different wavelength.

According to the present invention, degradation of the light receiving element caused by ultraviolet is small since the amount of ultraviolet arriving at the light receiving element after output from the wavelength conversion element to become disturbance light is small. More preferably, the dimension in the direction perpendicular to the first plane corresponds to a dimension that can convert at least 90% the ultraviolet incident from the first plane into converted light of a different wavelength.

BEST MODE FOR CARRYING OUT THE INVENTION

Embodiments of the present invention will be described hereinafter with reference to the drawings.

Figure 1:
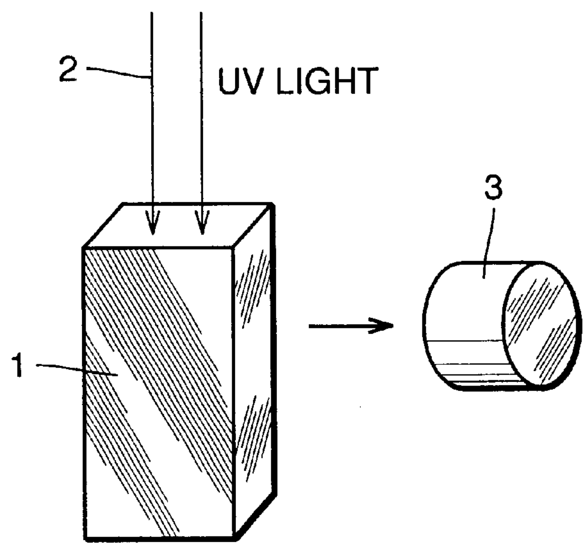
FIG. 1 is a diagram showing a schematic structure of an ultraviolet detector according to an embodiment of the present invention.

Referring to FIG. 1, an ultraviolet detector according to an embodiment of the present invention includes a wavelength conversion element 1 long in the incident direction of UV light (ultraviolet) 2, and a light receiving element 3 arranged at a side of wavelength conversion element 1, and close to the incident portion. As to the dimension of wavelength conversion element 1, the length in the UV light incident direction is 10 mm, the side plane corresponding to the arrangement of light receiving element 3 is 2×10 mm, the top plane where UV light is incident is 2×5 mm, and the side plane orthogonal to these two planes is 5×10 mm. The light receiving plane of light receiving element 3 is 2×2 mm. Fluorescent glass is used for wavelength conversion element 1.

In this ultraviolet detector, wavelength conversion element 1 is increased in length in the incident direction of UV light 2, and light receiving element 3 is arranged at the side plane of wavelength conversion element 1. This arrangement prevents direct introduction of unconverted UV light into light receiving element 3 to suppress degradation. Since wavelength conversion element 1 is extended in the incident direction of UV light 2, unconverted UV light is significantly attenuated. Even if it enters light receiving element 3 as a result of reflection in the sensor casing not shown, degradation does not occur easily.

Figure 2:
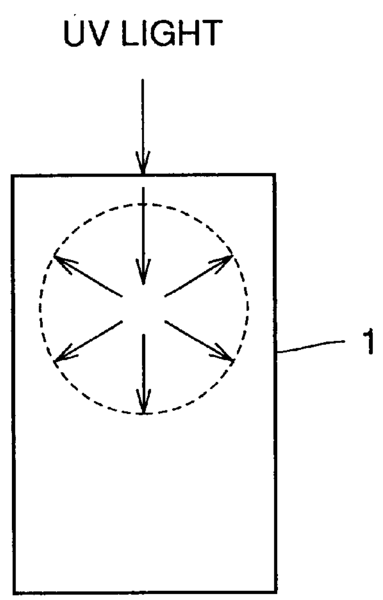
FIG. 2 is a diagram to describe propagation after wavelength conversion of the wavelength conversion element.

Although UV light is propagated only in the direction limited to the incident direction, visible light converted in wavelength conversion element 1 is propagated isotropically, as shown in FIG. 2. Therefore, the quantity of light can be monitored even if light receiving element 3 is arranged in the direction shown in FIG. 1, i.e., in a direction orthogonal to the incident direction of UV light 2.

Since the light receiving element is in a direction orthogonal to the light incident direction, there is the advantage of being impervious to disturbance light.

According to the ultraviolet detector of the present embodiment, light receiving element 3 is arranged close to the entrance of UV light. Therefore, the power after conversion is great to allow a large signal. Although a light receiving element having a large light receiving area covering the entire side of wavelength conversion element 1 can be employed, arrangement of light receiving element 3 close to the incident portion of the UV light allows a relatively great signal to be obtained even with a light receiving element of small light receiving area and of low cost. In FIG. 1, light receiving element 3 is provided apart from the side plane of wavelength conversion element 1. However, light receiving element 3 can be provided in contact with, or spaced apart appropriately from the side plane of wavelength conversion element 1. The same applies for the following embodiments.

Figure 3:
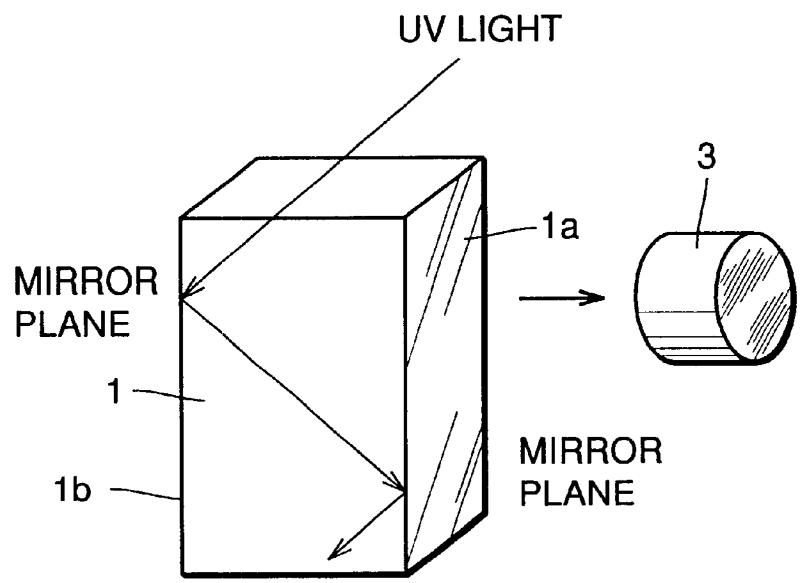
FIG. 3 shows a schematic structure of an ultraviolet detector according to another embodiment of the present invention.
Figure 4:
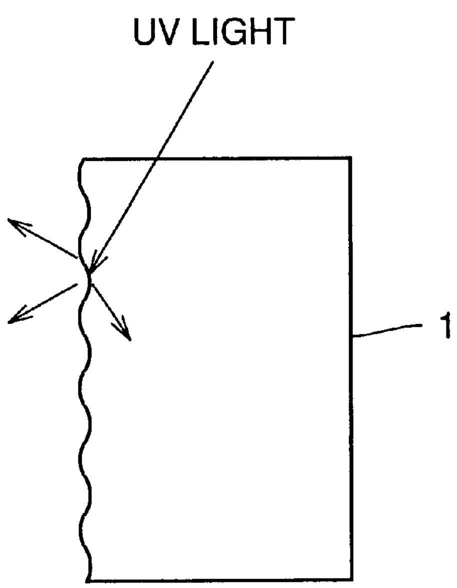
FIG. 4 is a diagram to describe light propagation when the side plane of the wavelength conversion element is a rough plane.

FIG. 3 shows an ultraviolet detector according to another embodiment of the present invention. In the ultraviolet detector of the present embodiment, the surface of side planes 1*a* and 1*b* of wavelength conversion element 1 is polished, for example, as a mirror, i.e., is planar with respect to the wavelength of ultraviolet radiation. When the surface of wavelength conversion element 1 is rough as shown in FIG. 4, the UV light or disturbance light arriving at the surface is partially output. Therefore, the light receiving element will be degraded or will carry out erroneous operation easily by the disturbance light.

Figure 5:
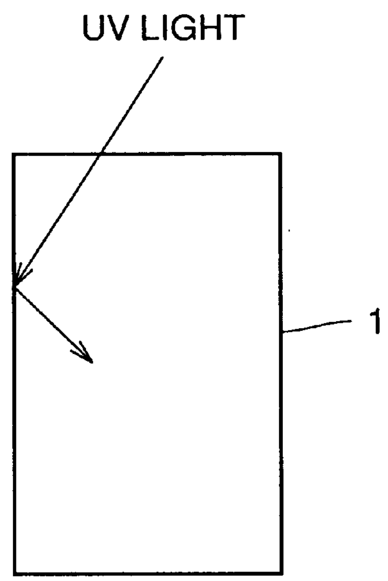
FIG. 5 is a diagram to describe light propagation when the side plane of the wavelength conversion element is a mirror plane.

By setting at least surface 1*a* of wavelength conversion element 1 corresponding to the side of light receiving element 3 as a mirror in the ultraviolet detector of the present embodiment, the diffusion component at the surface can be eliminated as shown in FIG. 5 to suppress output of UV light or disturbance light.

Figure 6:
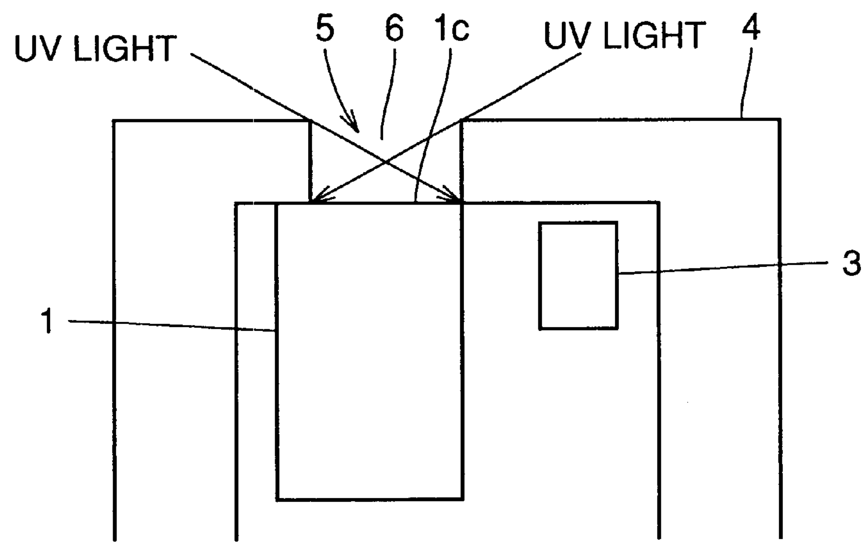
FIG. 6 is a diagram showing a schematic structure of an ultraviolet detector according to a further embodiment of the present invention.
Figure 7:
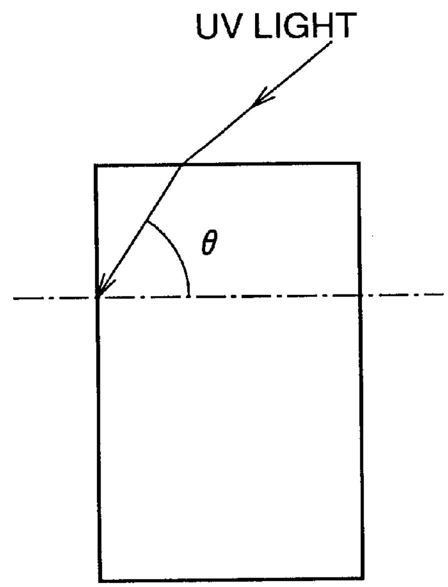
FIG. 7 is a diagram to describe total reflection within the wavelength conversion element of the ultraviolet detector according to the further embodiment of the present invention.

FIG. 6 shows an ultraviolet detector according to a further embodiment of the present invention. In the ultraviolet detector of the present embodiment, the depth (thickness) of an opening 6 of an incident window 5 of a sensor case 4 is increased to set the incident angle to an angle restricted by the depth of opening 6, i.e., an angle restricted by the surface of opening 6 and opening 1*c* of wavelength conversion element 1. In the case where wavelength conversion element 1 has glass, for example, as the parent material, the total reflection angle at the interface with air is approximately 43 degrees since the index of refraction is approximately 1.5. More specifically, total reflection is achieved at the side plane to suppress exit by restricting through the opening so that ultraviolet is incident at an angle of 43 degrees to 90 degrees (angle θ in FIG. 7) with respect to the side plane of wavelength conversion element 1. Accordingly, unconverted UV light or disturbance light is prevented from entering light receiving element 3.

Figure 8:
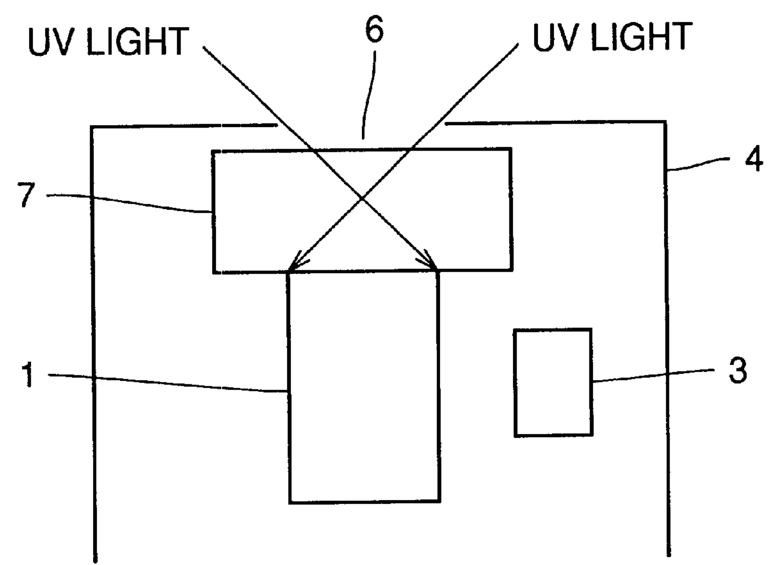
FIG. 8 is a diagram showing a schematic structure of an ultraviolet detector according to still another embodiment of the present invention.

FIG. 8 shows an ultraviolet detector according to still another embodiment of the present invention. When $\theta > 43°$ for the ultraviolet detector of FIG. 6, a dent will be generated from opening 6 at the surface. Dust and residue will be gathered at the dent, whereby the property is altered. According to the ultraviolet detector shown in FIG. 8, quartz glass 7 having superior transmittance of UV light is arranged between opening 6 and wavelength conversion element 1 as a separate member. By virtue of this arrangement of quartz glass 7, UV light is transmitted without generation of a great dent at opening 6. Also, oblique incidence of VV light and disturbance light can be cut. A visible light cut member can be arranged instead of quartz glass 7. Accordingly, disturbance light can be cut with no dent generated at opening 6. As an alternative to quartz glass 7, a second wavelength conversion element can be used. The usage of this wavelength conversion element suppresses oblique entrance of light and eliminates gathering of dust and residue as well as attenuating UV light. Therefore, UV light of higher intensity entering the light receiving element can be attenuated to prevent the light receiving element from being degraded.

Figure 9:
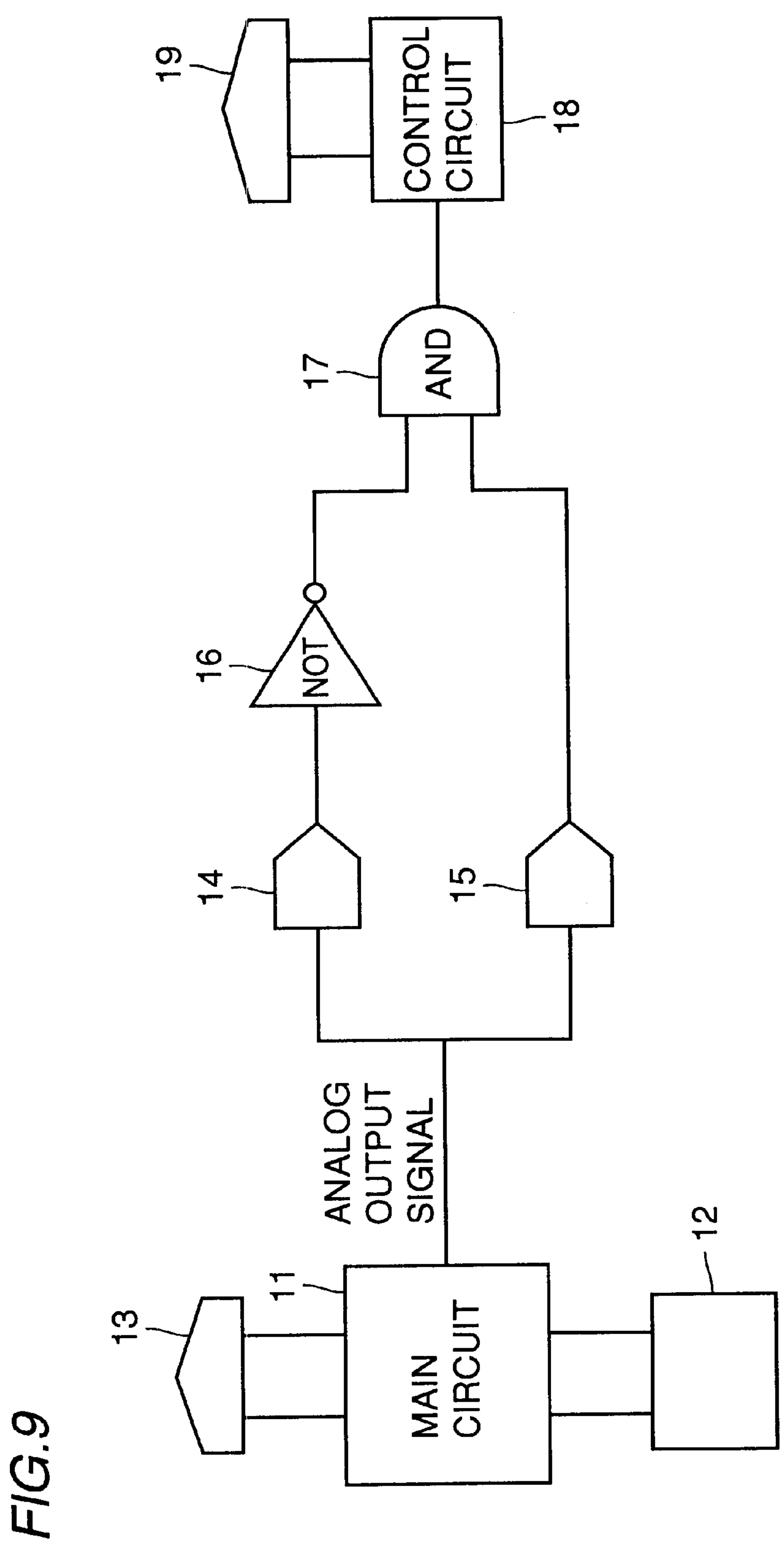
FIG. 9 is a block diagram showing a structure of an ultraviolet detector according to still a further embodiment of the present invention.

FIG. 9 is a block diagram showing an ultraviolet detector according to a still further embodiment of the present invention. Since the quantity of UV light depends upon variation of the light source and the installed distance, the sensitivity of the sensor (amplification factor) must be adjusted according to the installment condition. The ultraviolet detector of the present embodiment is directed to facilitate sensitivity adjustment.

The ultraviolet detector of the present embodiment includes a main circuit 11 for ultraviolet detection, a sensitivity adjustment volume 12 to adjust sensitivity thereof, a power supply display LED (Light Emitting Diode) 13, an upper limit value comparator 14 comparing the output signal of main circuit 11 with the upper value, a lower limit value comparator 15 comparing the output signal with the lower limit value, a NOT circuit 16, an AND circuit 17, a control circuit 18, and an input light display LED 19.

In the case where sensitivity adjustment VR 12 is adjusted manually at the initial adjustment in the ultraviolet detector of the present embodiment, the analog output signal of main circuit 11 that changes continuously is compared with predetermined upper and lower limit values. An analog output signal value therebetween, if any, is notified by turning on input light indicator 19.

Indicating by means of the indicator that the output of the sensor unit approximates a predetermined value can facilitate the adjustment. The detected output of the ultraviolet detector is an analog output signal of main circuit 11.

Figure 10A:
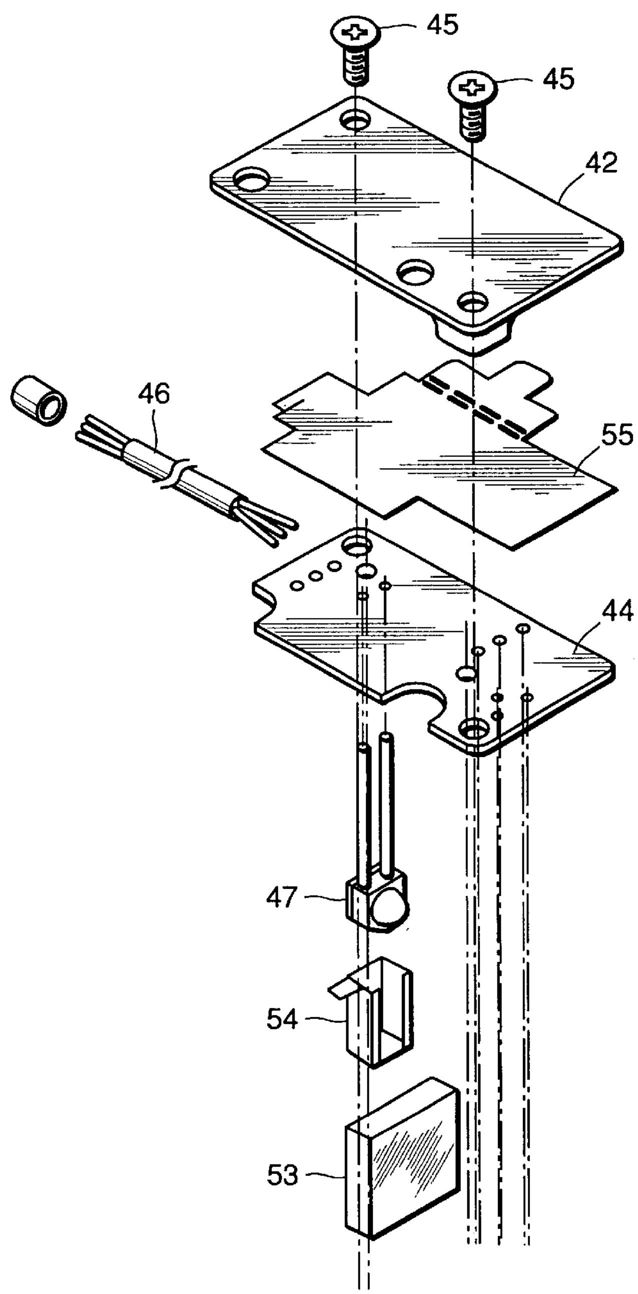
FIGS. 10A, 10B and 11 are exploded perspective views showing a specific embodiment of the present invention.
Figure 10B:
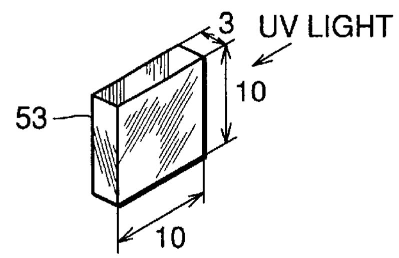
Figure 11:
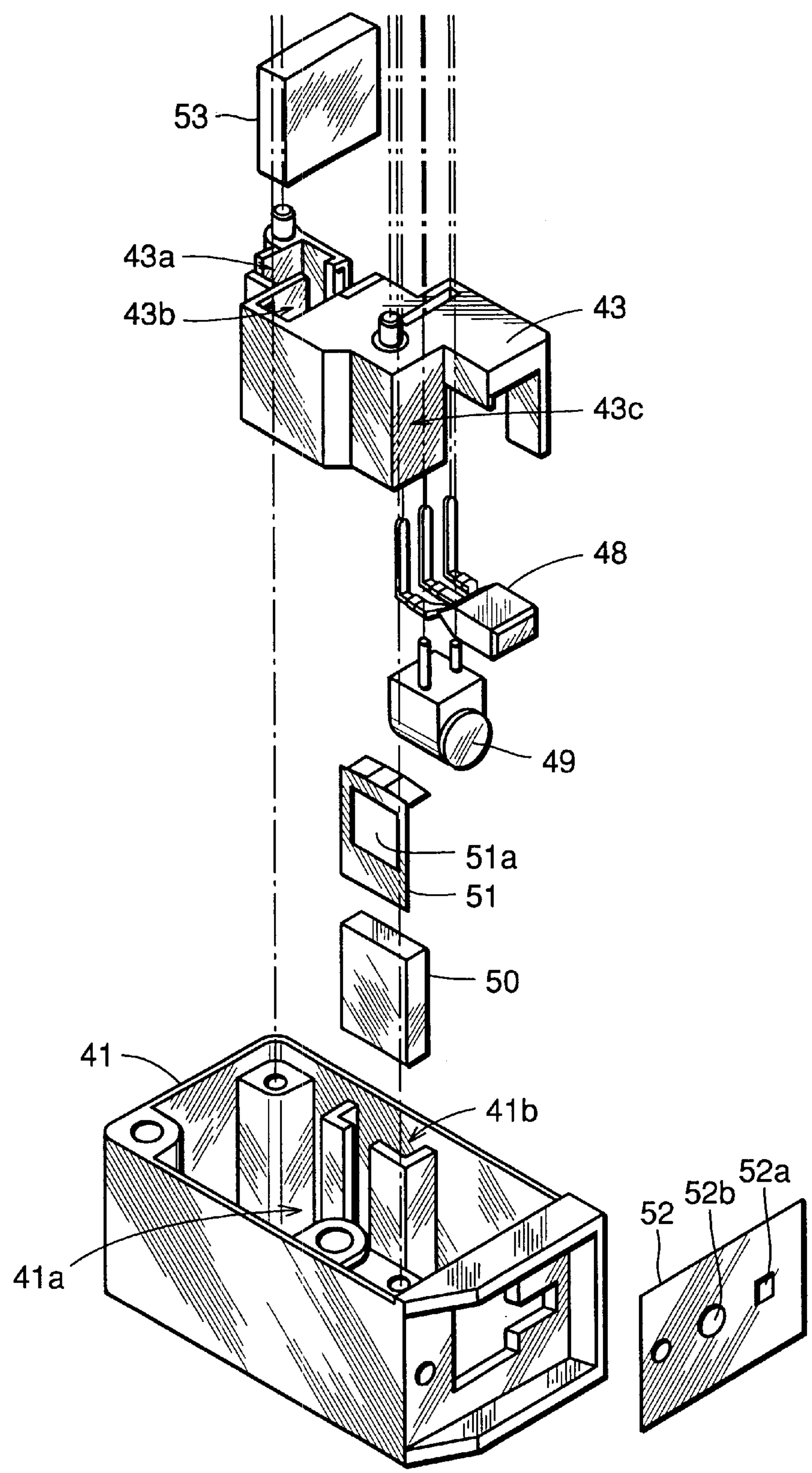
Figure 12A:
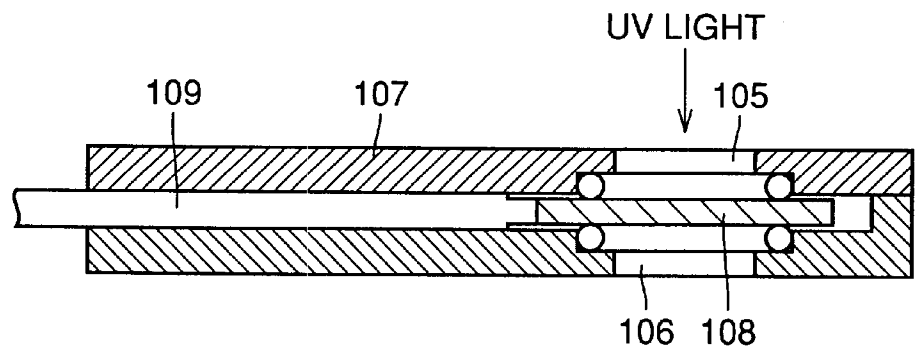
FIGS. 12A and 12B show an example of a conventional ultraviolet detector.
Figure 12B:
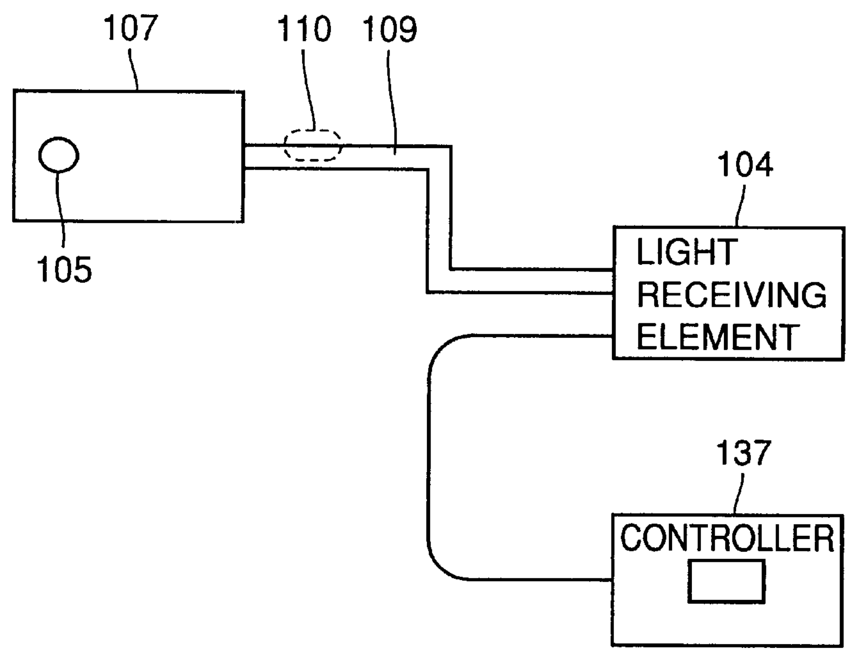

FIGS. 10A, 10B and 11 are exploded perspective views of an ultraviolet detector corresponding to a specific embodiment of the present invention. FIGS. 10A and 11 are divisions of one exploded perspective view. In FIGS. 10A and 11, fluorescent glass (wavelength conversion element) 53 indicates the same one.

The ultraviolet detector of the present embodiment includes a main case 41 and a cover 42 as the external case. Under the state where a holder 43, a PC (Personal Computer) board 44, and the like are accommodated in main case 41, cover 42 is fastened to main case 41 by means of a screw 45. A cord 46 is connected to PC board 44. Also, a light receiving element 47, a display LED 48, a variable resistor 49 for sensitivity adjustment are connected to PC board 44. Other electronic circuitry is mounted on PC board 44.

In main case 41 are formed a concave 41*a* accommodating a holder 43, and a concave 41*b* accommodating quartz glass 50 and a plate filter 51. Quartz glass 50 corresponds to quartz glass 7 of FIG. 8. In the assembled state, ultraviolet is incident on quartz glass 50 from the opening provided in main case 41 (not observable in the drawing) through a window 51*a* of plate filter 51. A label 52 is attached at the side plane of main case 41. A window 52a for display LED 48 and a hole 52*b* for operating variable resistor 49 are provided at label 52.

Holder 43 includes a concave 43*a* accommodating light receiving element 47, a concave 43*b* accommodating fluorescent glass 53, and a cavity 43*c* storing display LED 48 and variable resistor 49. Light receiving element 47 covered by a plate shield 54 is stored in concave 43*a*. Fluorescent glass 53 is stored in concave 43*b*. This fluorescent glass 53 is the wavelength conversion element. Light receiving element 47 is positioned at a side plane of fluorescent glass 53 under the stored state.

FIG. 10B shows the specific dimension of fluorescent glass 53. The dimension is represented in the unit of mm. UV light is incident from the direction of the arrow in the drawing. The element disclosed in Japanese Patent Laying-Open No. 10-167755 can be employed as fluorescent glass 53.

Fluorescent glass 53 employed in the present embodiment converts ultraviolet radiation of 200–400 nm in wavelength into green light of 540 nm in wavelength. It has been confirmed by experiments that, in the case of fluorescent glass 53 of the present embodiment when the dimension in the ultraviolet traveling direction is 6 mm, at least 90% the incident ultraviolet can be converted. In the case where the dimension is 10 mm of the present embodiment, most of the ultraviolet is converted into green light. It is preferable to convert at least 80% the ultraviolet in order to prevent the light receiving element from being degraded by ultraviolet radiation.

In assembling the entirety, quartz glass 50 and plate filter 51 are accommodated in concave 41*a* of main case 41. Then, holder 43 in which fluorescent glass 53 is stored in concave 43*b* is placed in concave 41*a*. PC board 44 mounted with light receiving element 47, display LED 48 and variable resistor 49 and the like is attached from above holder 43. Accordingly, light receiving element 47 is stored in concave 43*a* whereas LED 48 and variable resistor 49 are stored in cavity 43*c*. Lastly, PC board 44 is covered with film shield 55, and cover 42 is screwed to main case 41. Thus, assembly is completed.

INDUSTRIAL APPLICABILITY

As described above, the ultraviolet detector of the present invention has the wavelength conversion element formed expanded in the ultraviolet incident direction, and the light receiving element arranged at the side of the wavelength conversion element. Therefore, unconverted ultraviolet will not directly enter the light receiving element, so that the light receiving element will not be degraded. The ultraviolet detector of the present invention is widely applicable to the field where the incident amount of ultraviolet is converted into a different wavelengths by a wavelength conversion element.

What is claimed is:

1. An ultraviolet detector comprising:

a wavelength conversion element (1) formed of a material converting ultraviolet (2) into converted light of a different wavelength, and having a first plane on which ultraviolet is incident and a second plane from which said converted light is output, and a light receiving element (3) receiving said converted light output from said second plane, wherein said wavelength conversion element has said first plane and said second plane non-parallel with each other, and dimension in a direction perpendicular to said first plane is greater than the dimension of a direction perpendicular to said second plane.

2. The ultraviolet detector according to claim 1, wherein said first plane and said second planes are orthogonal to each other.

3. The ultraviolet detector according to claim 1, wherein said wavelength conversion element (1) is plate-like, and one plane thereof is said first plane, and one of a front plane and a back plane sandwiching said first plane and having a region of the largest area is said second plane.

4. The ultraviolet detector according to claim 1 or 3, wherein said wavelength conversion element (1) has at least said second plane planar with respect to ultraviolet wavelength.

5. The ultraviolet detector according to claim 1 or 3, wherein said light receiving element (3) is arranged so that its center is located opposite to a position closer to said first plane than the center position of said second plane.

6. The ultraviolet detector according to claim 1 or 3, further comprising incident angle restriction means (4) for restricting an incident angle of ultraviolet incident on said first plane, wherein said incident angle restriction means (4) restricts the incident angle of ultraviolet (2) in a first incident plane including a normal of said second plane to be within a predetermined angle, and allows incidence of ultraviolet (2) in a second incident plane perpendicular to said first incident plane at an incident angle greater than said predetermined angle.

7. The ultraviolet detector according to claim 1 or 3, further comprising an incident window (6, 7) formed of a material converting ultraviolet (2) into converted light of a different wavelength in order to attenuate ultraviolet (2) incident on said wavelength conversion element (1).

8. The ultraviolet detector according to claim 1 or 3, further comprising:

a detection circuit (11) providing a detection signal of a level corresponding to the level of an output of said light receiving element (3), display means (13) turned on when the level of said detection signal is within a set range, and sensitivity adjustment means (12) for adjusting sensitivity of said detection signal with respect to an amount of ultraviolet received by the ultraviolet detector.

9. An ultraviolet detector comprising:

a wavelength conversion element (1) formed of a material converting ultraviolet (2) into converted light of a different wavelength, and having a first plane on which ultraviolet (2) is incident and a second plane from which said converted light is output, and a light receiving element (3) receiving said converted light output from said second plane, wherein said wavelength conversion element (1) has said first plane and said second plane non-parallel with each other, and dimension in a direction perpendicular to said first plane is dimension that can convert at least 80% the ultraviolet (2) incident on said first plane into converted light of a different wavelength.

* * * * *